US010369547B2

(12) United States Patent
Ifrah et al.

(10) Patent No.: US 10,369,547 B2
(45) Date of Patent: Aug. 6, 2019

(54) COMPOSITION BASED ON OXIDES OF CERIUM, OF ZIRCONIUM AND OF ANOTHER RARE EARTH METAL WITH HIGH REDUCIBILITY, PREPARATION PROCESS AND USE IN THE FIELD OF CATALYSIS (75) Inventors: Simon Ifrah, La Jarrie (FR);
Emmanuel Rohart, Sainte Soulle (FR);
Julien Hernandez, Antony (FR);
Dominique Horbez, Franconville (FR);
Lama Itani, Savigny-sur-Orge (FR)

(73) Assignee: RHODIA OPERATIONS, Aubervilliers (FR)

( * ) Notice: Subject to any disclaimer, the term of this patent is extended or adjusted under 35 U.S.C. 154(b) by 399 days.

(21) Appl. No.: 14/125,639

(22) PCT Filed: Jun. 13, 2012

(86) PCT No.: PCT/EP2012/061179
§ 371 (c)(1),
(2), (4) Date: Mar. 31, 2014

(87) PCT Pub. No.: WO2012/171947
PCT Pub. Date: Dec. 20, 2012

(65) Prior Publication Data
US 2014/0205522 A1    Jul. 24, 2014

(30) Foreign Application Priority Data

Jun. 17, 2011 (FR) .................................... 11 01867

(51) Int. Cl.
*B01J 23/10* (2006.01)
*C01G 25/00* (2006.01)
(Continued)

(52) U.S. Cl.
CPC ............ *B01J 23/10* (2013.01); *B01D 53/945* (2013.01); *B01J 23/34* (2013.01); *B01J 23/83* (2013.01);
(Continued)

(58) Field of Classification Search
CPC . B01J 21/066; B01J 23/10; B01J 23/72; B01J 23/745; B01J 23/75; B01J 23/78;
(Continued)

(56) References Cited

U.S. PATENT DOCUMENTS 6,150,288 A      11/2000  Suzuki et al.
6,228,799 B1 *   5/2001   Aubert ................. B01D 53/945
                                            423/239.1

(Continued)

FOREIGN PATENT DOCUMENTS

EP    0 834 348 A2    4/1998
EP    1 632 288 A1    3/2006
(Continued)

OTHER PUBLICATIONS

Brunauer Stephen; Emmett P . H.; Teller Edward—Adsorption of Gases in Multimolecular Layers—J. Am. Chem. Soc., 1938, 60 (2), pp. 309-319 [DOI: 10.1021/ja01269a023].

*Primary Examiner* — James A Fiorito
(74) *Attorney, Agent, or Firm* — Osha Liang LLP (57) ABSTRACT The composition of the invention is based on oxides of cerium, of zirconium and of at least one rare earth metal other than cerium, with a cerium oxide content of greater than 50% by weight and it has, after calcination at 1000° C. for 4 hours, a specific surface area of at least 20 m²/g and an amount of mobile oxygen between 200° C. and 400° C. of at least 0.8 ml O₂/g. It is prepared by a process in which, in a reactor, a mixture of compounds of cerium, of zirconium and of the other rare earth metal is reacted continuously with (Continued)

a basic compound with a residence time of the reaction medium in the mixing zone of the reactor of at most 100 milliseconds; the precipitate is heated then brought into contact with a surfactant before being calcined.

12 Claims, 2 Drawing Sheets

(51) Int. Cl.
| | |
|---|---|
| *B01D 53/94* | (2006.01) |
| *B01J 37/03* | (2006.01) |
| *B01J 37/06* | (2006.01) |
| *B01J 37/34* | (2006.01) |
| *B01J 23/34* | (2006.01) |
| *B01J 23/83* | (2006.01) |
| *B01J 35/02* | (2006.01) |
| *B01J 35/10* | (2006.01) |
| *B01J 37/00* | (2006.01) |

(52) U.S. Cl.
CPC ......... *B01J 35/023* (2013.01); *B01J 35/1014* (2013.01); *B01J 37/0018* (2013.01); *B01J 37/031* (2013.01); *B01J 37/06* (2013.01); *B01J 37/343* (2013.01); *C01G 25/006* (2013.01); *B01D 53/944* (2013.01); *B01D 2255/206* (2013.01); *B01D 2255/2065* (2013.01); *B01D 2255/20715* (2013.01); *B01D 2255/9207* (2013.01); *C01P 2002/50* (2013.01); *C01P 2004/61* (2013.01); *C01P 2006/13* (2013.01); *Y02T 10/22* (2013.01)

(58) Field of Classification Search
CPC . B01J 23/83; B01J 23/34; B01J 35/023; B01J 35/1014; B01J 37/0018; B01J 37/031; B01J 37/06; B01J 37/343; B01D 53/945; C01G 25/006
USPC ................ 502/304, 349, 324, 328, 331, 338
See application file for complete search history.

(56) References Cited

U.S. PATENT DOCUMENTS

| | | |
|---|---|---|
| 6,306,794 B1 | 10/2001 | Suzuki et al. |
| 2006/0052242 A1 | 3/2006 | Iwakuni et al. |
| 2007/0189955 A1 | 8/2007 | Larcher et al. |
| 2010/0028236 A1 | 2/2010 | Shen et al. |
| 2011/0166014 A1 | 7/2011 | Larcher et al. |

FOREIGN PATENT DOCUMENTS

| | | |
|---|---|---|
| FR | 2570087 A1 | 3/1986 |
| FR | 2 859 470 A1 | 3/2005 |
| WO | 9845212 A1 | 10/1998 |
| WO | 2011/138255 A2 | 11/2011 |

* cited by examiner

COMPOSITION BASED ON OXIDES OF CERIUM, OF ZIRCONIUM AND OF ANOTHER RARE EARTH METAL WITH HIGH REDUCIBILITY, PREPARATION PROCESS AND USE IN THE FIELD OF CATALYSIS

CROSS-REFERENCE TO RELATED APPLICATIONS

This application is a U.S. national stage entry under 35 U.S.C. § 371 of International Application No. PCT/EP2012/061179 filed Jun. 13, 2012, which claims priority to French Application No. 1101867, filed Jun. 17, 2011. The entire contents of these applications are explicitly incorporated herein by this reference.

The present invention relates to a composition based on oxides of cerium, zirconium and at least one rare-earth metal other than cerium, with high reducibility, to the process for preparing it and to its use in the field of catalysis.

"Multifunctional" catalysts are currently used for the treatment of exhaust gases from internal combustion engines (motor vehicle afterburning catalysis). The term "multifunctional" refers to catalysts that are capable of carrying out not only oxidation, in particular of carbon monoxide and hydrocarbons present in exhaust gases, but also reduction, in particular of the nitrogen oxides also present in these gases ("three-way" catalysts). Products based on cerium oxide, zirconium oxide and one or more oxides of other rare-earth metals appear today as particularly important and advantageous constituents included in the composition of catalysts of this type. To be effective, these constituents must have a high specific surface area even after having been subjected to high temperatures, for example of at least 900° C.

Another quality required for these catalyst constituents is reducibility. The term "reducibility" means here, and for the rest of the description, the capacity of the catalyst to be reduced under a reductive atmosphere and to be reoxidized under an oxidizing atmosphere. The reducibility may be measured especially by the amount of mobile oxygen or of labile oxygen per unit mass of the material and for a given temperature range. This reducibility and, consequently, the efficacy of the catalyst are maximal at a temperature which is currently quite high for catalysts based on the abovementioned products. Now, there is a need for catalysts whose performance qualities are sufficient in lower temperature ranges.

In the current state of the art, it appears that the two characteristics mentioned above are often difficult to reconcile, i.e. high reducibility at a lower temperature has as a counterpart a rather low specific surface area.

The object of the invention is to provide a composition of this type which has in combination a high specific surface area and good reducibility at a lower temperature.

With this aim, the composition of the invention is based on oxides of cerium, zirconium and at least one rare-earth metal other than cerium, with a cerium oxide content of greater than 50% by mass, and it is characterized in that it has, after calcination at 1000° C. for 4 hours, a specific surface area of at least 20 m$^2$/g and an amount of oxygen that is mobile between 200° C. and 400° C. of at least 0.8 ml O$_2$/g.

Other features, details and advantages of the invention will become even more fully apparent on reading the description which follows given with reference to the attached drawings in which.

For the continuation of the description, specific surface area is understood to mean the BET specific surface area determined by nitrogen adsorption in accordance with the standard ASTM D 3663-78 drawn up from the Brunauer-Emmett-Teller method described in the periodical "The Journal of the American Chemical Society", 60, 309 (1938).

For the present description, rare-earth metal is understood to mean the elements of the group consisting of yttrium and the elements of the Periodic Table with an atomic number between 57 and 71 inclusive.

In addition, the calcinations and especially the calcinations after which the surface area values are given are calcinations in air at a temperature steady stage over the indicated period, unless otherwise mentioned.

The contents or amounts are given as mass of oxide relative to the entire composition, unless otherwise mentioned. The cerium oxide is in the form of ceric oxide and the oxides of the other rare-earth metals are in the form Ln$_2$O$_3$, Ln denoting the rare-earth metal, with the exception of praseodymium, expressed in the form Pr$_6$O$_{11}$.

It is specified, for the continuation of the description, that, unless otherwise indicated, in the ranges of values which are given, the values at the limits are included.

The amount of mobile or labile oxygen corresponds to half of the molar amount of hydrogen consumed by reduction of the oxygen of the composition to form water and measured between different temperature limits, between 200° C. and 450° C. or even between 200 and 400° C. This measurement is performed by temperature-programmed reduction on an Autochem II 2920 machine with a silica reactor. Hydrogen is used as reducing gas at 10% by volume in argon with a flow rate of 30 mL/minute. The experimental protocol consists in weighing out 200 mg of the sample in a pre-tared container. The sample is then introduced into a quartz cell containing quartz wool in the bottom. The sample is finally covered with quartz wool, placed in the oven of the measuring machine, and a thermocouple is placed at the core of the sample. A signal is detected with a thermal conductivity detector. Hydrogen consumption is calculated from the missing surface area of the hydrogen signal between 200° C. and 450° C. or even between 200° C. and 400° C.

The maximum reducibility temperature (temperature at which the uptake of hydrogen is maximal and at which, in other words, the reduction of cerium IV to cerium III is also maximal and which corresponds to maximum O$_2$ lability of the composition) is measured by performing a temperature-programmed reduction, as described above. This method makes it possible to measure the hydrogen consumption of a composition according to the invention as a function of the temperature and to deduce therefrom the temperature at which the degree of cerium reduction is maximal.

The reducibility measurement is performed by temperature-programmed reduction on a sample that has been calcined beforehand for 4 hours at 1000° C. in air. The temperature rise takes place from 50° C. to 900° C. at a rate of 10° C./minute. The hydrogen uptake is calculated from the missing surface area of the hydrogen signal from the baseline at room temperature to the baseline at 900° C.

The maximum reducibility temperature is reflected by a peak on the curve obtained via the temperature-programmed reduction method that has been described. It should be noted, however, that in certain cases such a curve may comprise two peaks.

The compositions according to the invention are characterized first of all by the nature of their constituents.

The compositions of the invention are of the mixed oxide type, based on cerium oxide and which also comprise zirconium oxide and an oxide of at least one rare-earth metal other than cerium. For the remainder of the description, it should be understood that although, for the sake of simplicity, only one rare-earth metal is mentioned, it is clearly understood that the invention applies to the case where the compositions comprise several rare-earth metals, especially two.

The rare-earth metal other than cerium may be chosen more particularly from yttrium, lanthanum, neodymium, praseodymium and gadolinium. Mention may be made more particularly of compositions based on cerium, zirconium, praseodymium and lanthanum oxides, those based on cerium, zirconium, praseodymium and yttrium oxides, those based on cerium, zirconium, neodymium and lanthanum oxides, those based on cerium, zirconium, lanthanum and gadolinium oxides and those based on cerium, zirconium, lanthanum and yttrium oxides.

The cerium oxide content is greater than 50%. It may be between a value greater than 50% and 90%, especially between 55% and 80% and even more particularly between 60% and 80%.

The content of oxide of the other rare-earth metal, or of all of the other rare-earth metals, is generally not more than 30%, more particularly not more than 20% and even more particularly not more than 15%. This content may be at least 2%, preferably at least 5% and especially at least 10%. It may in particular be between 5% and 20%.

The compositions of the invention may also contain one or more additional elements that may be chosen from the group comprising iron, cobalt, strontium, copper and manganese. This or these additional elements are generally present in oxide form. The amount of additional element is generally not more than 10%, and it may more particularly be between 2% and 8%.

The invention also relates to compositions consisting essentially of oxides of cerium, zirconium and at least one rare-earth metal other than cerium and, optionally, of one or more abovementioned additional elements. This means that they may comprise other elements in the form of traces or impurities, especially such as hafnium, but they do not comprise other elements that are especially liable to have an influence on their specific surface area and/or their reducibility properties.

The compositions of the invention have the characteristic of having a substantial amount of mobile oxygen in a relatively low temperature range. This amount, expressed in ml of oxygen per gram of composition, is at least 0.8 between 200° C. and 400° C. This amount may especially be at least 1 ml $O_2$/g, more particularly at least 1.2 ml $O_2$/g and even more particularly at least 1.8 $O_2$/g. Amounts of up to about at least 2 ml $O_2$/g may be reached.

In a slightly wider temperature range, i.e. between 200° C. and 450° C., the compositions of the invention have an amount of mobile oxygen of at least 1 ml $O_2$/g, more particularly of at least 2 ml $O_2$/g and even more particularly of at least 2.5 ml $O_2$/g. Amounts of up to about at least 3.5 ml $O_2$/g may be reached.

Another feature of the compositions of the invention is that they have, after calcination at 1000° C. for 4 hours, a maximum reducibility temperature of not more than 520° C. and more particularly not more than 510° C. This maximum reducibility temperature may especially be between 430° C. and 520° C.

The compositions of the invention also have particular specific surface area characteristics. Specifically, while at the same time having good reducibility properties at low temperature, they also offer high specific surface areas even at high temperatures.

Thus, they have, after calcination at 1000° C. for 4 hours, a specific surface area of at least 20 $m^2$/g and more particularly of at least 25 $m^2$/g. For the compositions whose cerium oxide content is not more than 70%, this specific surface area may be at least 30 $m^2$/g and more particularly at least 35 $m^2$/g. Under these same calcination conditions, specific surface areas up to a value of about 45 $m^2$/g may be obtained.

Moreover, after calcination at 1100° C. for 4 hours, these compositions have a specific surface area of at least 10 $m^2$/g and more particularly of at least 12 $m^2$/g. Under these same calcination conditions, specific surface areas up to a value of about 30 $m^2$/g may be obtained.

Another advantageous characteristic of the compositions of the invention is that they may be in the form of deaggregatable particles. Thus, via a simple ultrasonication treatment, these particles may have, after such a treatment and irrespective of the starting particle size, a mean diameter ($d_{50}$) of not more than 10 µm, more particularly not more than 8 µm and even more particularly not more than 6 µm.

The particle sizes given here, and for the remainder of the description, are measured by means of a Malvern Mastersizer 2000 laser particle size analyzer (HydroG module) on a sample of particles dispersed in a solution containing 1 g/l of hexamethyl phosphate (HMP) and subjected to ultrasound (120 W) for 5 minutes.

The compositions of the invention are generally in the form of a pure solid solution of cerium oxide, zirconium oxide and the other rare-earth metal. This means that zirconium and the other rare-earth metal are present totally in solid solution in the cerium oxide. The X-ray diffraction diagrams of these compositions in particular reveal, in these compositions, the existence of a clearly identifiable single phase corresponding to that of a crystalline cerium oxide in the cubic system, thus reflecting the incorporation of zirconium and of the other rare-earth metal into the crystal lattice of the cerium oxide, and thus the production of a true solid solution. It should be noted that the compositions of the invention may have this solid solution characteristic even after calcination at high temperature, for example at least 1000° C. for 4 hours and even after calcination at a temperature of 1100° C. for 4 hours.

The process for preparing the compositions of the invention will now be described. This process may be performed according to several variants.

According to a first variant, the process is characterized in that it comprises the following steps:
  (a) a liquid mixture is formed comprising compounds of cerium, of zirconium, of the other rare-earth metal and, optionally, of the additional element;
  (b) said mixture is reacted continuously with a basic compound
    either in a reactor in which the residence time of the reaction medium in the mixing zone of the reactor is not more than 100 milliseconds,
    or in a centrifugal reactor in which the residence time of the reaction medium in the mixing zone of the reactor is not more than 10 seconds, via which a precipitate is obtained at the reactor outlet;

(c) said precipitate is heated in aqueous medium, the medium being maintained at a pH of at least 5;

(d) an additive chosen from anionic surfactants, nonionic surfactants, polyethylene glycols, carboxylic acids and salts thereof, and surfactants of the carboxymethylated fatty alcohol ethoxylate type is added to the precipitate obtained in the preceding step;

(e) the precipitate thus obtained is calcined.

The first step (a) of the process thus consists in preparing a mixture in liquid medium of the compounds of the constituent elements of the composition, i.e. cerium, zirconium and the additional rare-earth metal. In the case of the preparation of compositions comprising one or more additional elements of the abovementioned type, the starting mixture will also comprise a compound of this or these additional elements.

The mixing is generally carried out in a liquid medium which is preferably water.

The compounds are preferably soluble compounds. They may especially be salts of zirconium, of cerium, of rare-earth metal and optionally of an additional element.

These compounds may be chosen from nitrates, sulfates, acetates, chlorides and ceric ammonium nitrate.

Mention may thus be made, as examples, of zirconium sulfate, zirconyl nitrate or zirconyl chloride. Zirconyl nitrate is most generally used. Mention may also be made especially of cerium IV salts, for instance nitrates or ceric ammonium nitrate, which are particularly suitable for use herein. Ceric nitrate is preferably used. It is advantageous to use salts with a purity of at least 99.5% and more particularly of at least 99.9%. An aqueous ceric nitrate solution may be obtained, for example, by reacting nitric acid with a hydrated ceric oxide prepared in a conventional manner by reacting a solution of a cerous salt, for example cerous nitrate, and an ammonia solution in the presence of hydrogen peroxide. Use may also be made, preferably, of a ceric nitrate solution obtained according to the process of electrolytic oxidation of a cerous nitrate solution as described in document FR-A-2 570 087, and which constitutes herein an advantageous starting material.

It will be noted here that the aqueous solutions of cerium salts and of zirconyl salts may have a certain amount of initial free acidity, which may be adjusted by adding a base or an acid. It is, however, equally possible to use an initial solution of cerium and zirconium salts effectively having a certain amount of free acidity as mentioned above, or solutions that have been more or less rigorously neutralized beforehand. This neutralization may be performed by adding a basic compound to the abovementioned mixture so as to limit this acidity. This basic compound may be, for example, an ammonia solution or even a solution of alkali metal (sodium, potassium, etc.) hydroxides, but preferably an ammonia solution.

Finally, it will be noted that, when the starting mixture comprises cerium in III form, it is preferable to involve an oxidizing agent, for example hydrogen peroxide, in the course of the process. This oxidizing agent may be used by being added to the reaction mixture during step (a), during step (b) or at the start of step (c).

The mixture may be obtained, indiscriminately, either from compounds that are initially in the solid state, which will be subsequently introduced into a water feedstock, for example, or directly from solutions of these compounds followed by mixing, in any order, of said solutions.

In the second step (b) of the process, said mixture is placed in contact with a basic compound in order to cause them to react. Use may be made, as base or basic compound, of the products of the hydroxide type. Mention may be made of alkali metal or alkaline earth metal hydroxides. Use may also be made of secondary, tertiary or quaternary amines. However, the amines and ammonia may be preferred insofar as they reduce the risks of contamination by alkali metal or alkaline earth metal cations. Mention may also be made of urea. The basic compound can more particularly be used in the form of a solution.

The reaction between the starting mixture and the basic compound takes place continuously in a reactor. This reaction thus takes place by continuously introducing the reagents and also continuously removing the reaction product.

This reaction may take place according to two embodiments as a function of the type of reactor used.

According to a first embodiment, the reaction should take place under conditions such that the residence time of the reaction medium in the mixing zone of the reactor is not more than 100 milliseconds. The term "mixing zone of the reactor" means the part of the reactor in which the abovementioned starting mixture and the basic compound are placed in contact in order for the reaction to take place. This residence time may be more particularly not more than 50 milliseconds, and it may preferably be not more than 20 milliseconds. This residence time may be, for example, between 10 and 20 milliseconds.

Step (b) is preferably performed by using a stoichiometric excess of basic compound to ensure a maximum precipitation yield.

The reaction preferably takes place with vigorous stirring, for example under conditions such that the reaction medium is in a turbulent regime.

The reaction generally takes place at room temperature.

A reactor of rapid mixer type may be used.

The rapid mixer may be chosen in particular from symmetrical T-shaped or Y-shaped mixers (or tubes), asymmetrical T-shaped or Y-shaped mixers (or tubes), tangential-jet mixers, Hartridge-Roughton mixers or vortex mixers.

Symmetrical T-shaped or Y-shaped mixers (or tubes) generally consist of two opposing tubes (T-shaped tubes) or two tubes forming an angle of less than 180° (Y-shaped tubes), of the same diameter, discharging into a central tube, the diameter of which is identical to or greater than that of the two preceding tubes. They are said to be "symmetrical" because the two tubes for injecting the reactants have the same diameter and the same angle relative to the central tube, the device being characterized by an axis of symmetry. Preferably, the central tube has a diameter approximately twice as large as the diameter of the opposing tubes; similarly, the fluid velocity in the central tube is preferably equal to half that in the opposing tubes.

However, it is preferable to employ, in particular when the two fluids to be introduced do not have the same flow rate, an asymmetrical T-shaped or Y-shaped mixer (or tube) rather than a symmetrical T-shaped or Y-shaped mixer (or tube). In the asymmetrical devices, one of the fluids (generally the fluid with the lower flow rate) is injected into the central tube by means of a side tube of smaller diameter. The latter forms an angle generally of 90° with the central tube (T-shaped tube); this angle may be other than 90° (Y-shaped tube), giving cocurrent systems (for example an angle of 45°) or countercurrent systems (for example an angle of 135°), relative to the other current.

Advantageously, a tangential-jet mixer, for example a Hartridge-Roughton mixer, is used in the process according to the present invention.

Figure 1:
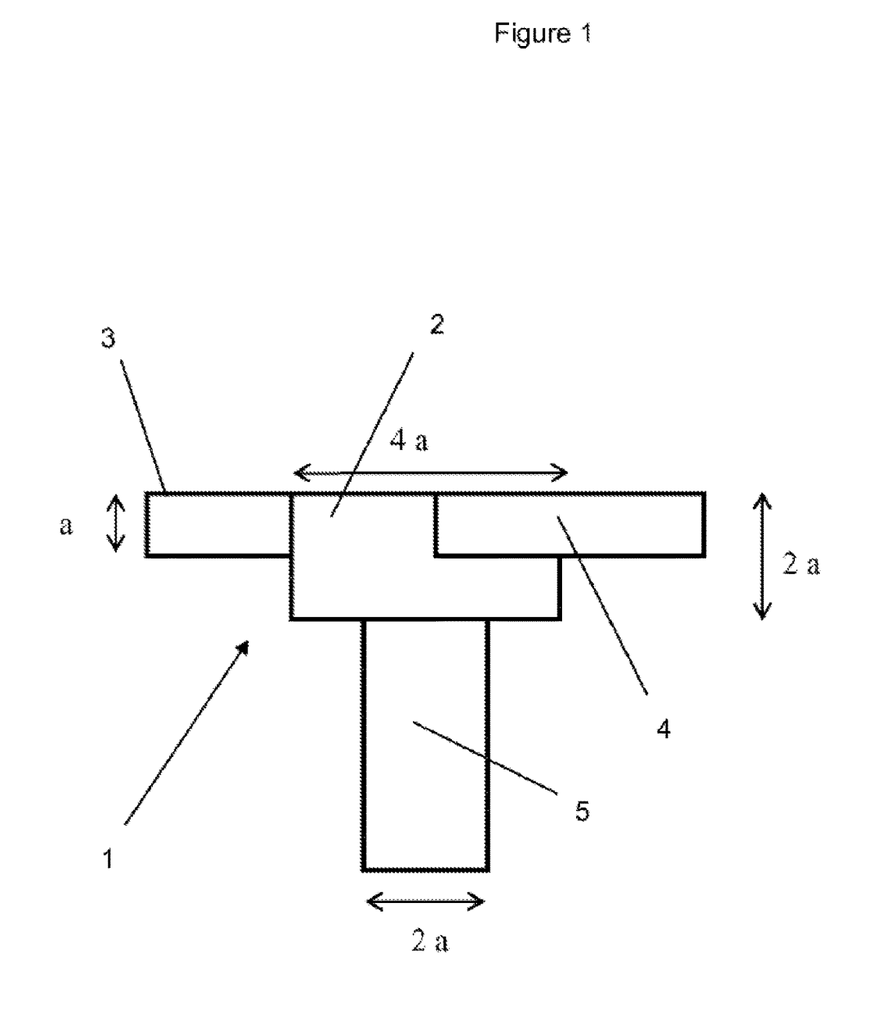
FIG. 1 is a scheme of a reactor used for performing the process for preparing the composition of the invention.

FIG. 1 is a scheme which shows a mixer of this type. This mixer 1 comprises a chamber 2 having at least two tangential admissions 3 and 4 via which (but at the same time) the reagents enter separately, i.e. in this case the mixture formed in step (a) and the basic compound, and also an axial outlet 5 via which the reaction medium exits, and does so, preferably, toward a reactor (tank) placed in series after said mixer. The two tangential admissions are preferably located symmetrically and in opposing manner relative to the central axis of the chamber 2.

The chamber 2 of the tangential jet, Hartridge-Roughton mixer used generally has a circular cross section and is preferably cylindrical in shape.

Each tangential admission tube may have an internal height (a) in cross section of from 0.5 to 80 mm.

This internal height (a) may be between 0.5 and 10 mm, in particular between 1 and 9 mm, for example between 2 and 7 mm. However, in particular on the industrial scale, it is preferably between 10 and 80 mm, in particular between 20 and 60 mm, for example between 30 and 50 mm.

The internal diameter of the chamber 2 of the tangential jet, Hartridge-Roughton mixer employed may be between 3a and 6a, in particular between 3a and 5a, for example equal to 4a; the internal diameter of the axial outlet tube 5 may be between 1a and 3a, in particular between 1.5a and 2.5a, for example equal to 2a.

The height of chamber 2 of the mixer may be between 1a and 3a, in particular between 1.5 and 2.5a, for example equal to 2a.

The reaction performed in step (b) of the process leads to the formation of a precipitate, which is removed from the reactor and recovered to perform step (c).

In the case of the second embodiment, step (b) is performed in a reactor of centrifugal type. A reactor of this type means rotary reactors using centrifugal force.

Examples of reactors of this type that may be mentioned include rotor-stator mixers or reactors, rotating-disk reactors (sliding-surface reactor), in which the reagents are injected under high shear into a confined space between the bottom of the reactor and a disk rotating at high speed, or alternatively reactors in which the centrifugal force mixes the liquids intimately as thin films. The Spinning Disc Reactor (SDR) or the Rotating Packed Bed reactor (RPB), described in patent application US 2010/0 028 236 A1, are included in this category. The reactor described in said patent application comprises a porous structure or packing, made of ceramic, metallic foam or plastic, of cylindrical shape, which rotates at high speed about a longitudinal axis. The reagents are injected into this structure and become mixed under the effect of high shear forces due to the centrifugal forces, which may reach several hundred g, created by the rotational motion of the structure. Mixing of the liquids in veins or very thin films thus makes it possible to achieve nanometric sizes.

The process according to the second variant of the invention may thus be performed by introducing into the above-mentioned porous structure the mixture formed in step (a).

The reagents thus introduced may be subjected to an acceleration of at least 10 g, more particularly of at least 100 g, and which may be, for example, between 100 g and 300 g.

Given their design, these reactors may be used with residence times of the reaction medium in their mixing zone (in the same sense as given above for the first variant) that are longer than for the first variant of the process, i.e. up to several seconds and in general not more than 10 s. Preferably, this residence time may be not more than 1 s, more particularly not more than 20 ms and even more particularly not more than 10 ms.

As for the preceding embodiment, step (b) is preferably performed using a stoichiometric excess of basic compound and this step generally takes place at room temperature.

Step (c) is a step of heating the precipitate in aqueous medium.

This heating may be performed directly on the reaction medium obtained after reaction with the basic compound or on a suspension obtained after separating the precipitate from the reaction medium, optional washing of the precipitate and placing the precipitate back in water. The temperature to which the medium is heated is at least 90° C. and even more particularly at least 100° C. It may be between 100° C. and 200° C. The heating operation may be performed by introducing the liquid medium into a closed chamber (closed reactor of the autoclave type). Under the temperature conditions given above, and in aqueous medium, it may be pointed out, by way of illustration, that the pressure in the closed reactor may range between a value greater than 1 bar ($10^5$ Pa) and 165 bar ($1.65 \times 10^7$ Pa), preferably between 5 bar ($5 \times 10^5$ Pa) and 165 bar ($1.65 \times 10^7$ Pa). It is also possible to carry out the heating in an open reactor for temperatures in the vicinity of 100° C.

The heating can be carried out either under air or under an inert gas atmosphere, preferably nitrogen.

The duration of the heating may vary within wide limits, for example between 1 minute and 2 hours, these values being given purely as a guide.

The medium subjected to heating has a pH of at least 5. Preferably, this pH is basic, i.e. it is greater than 7 and more particularly at least 8.

Several heating operations may be performed. Thus, the precipitate obtained after the heating step and optionally a washing operation may be resuspended in water and then another heating operation may be performed on the medium thus obtained. This other heating operation is carried out under the same conditions as those which were described for the first.

The following step of the process may take place according to two variants.

According to a first variant, an additive which is chosen from anionic surfactants, nonionic surfactants, polyethylene glycols, carboxylic acids and salts thereof, and surfactants of the carboxymethylated fatty alcohol ethoxylate type is added to the reaction medium obtained from the preceding step.

As regards this additive, reference may be made to the teaching of the application WO 98/45212 and the surfactants described in this document may be used.

Surfactants of the anionic type that may be mentioned include ethoxycarboxylates, ethoxylated or propoxylated fatty acids, especially those of the Alkamuls® brand, sarcosinates of formula R—C(O)N(CH$_3$)CH$_2$COO$^-$, betaines of formula RR'NH—CH$_3$—COO$^-$, R and R' being alkyl or alkylaryl groups, phosphate esters, especially those of the Rhodafac® brand, sulfates such as alcohol sulfates, alcohol ether sulfates and alkanolamide sulfate ethoxylates, sulfonates such as sulfosuccinates and alkylbenzene or alkylnaphthalene sulfonates.

Nonionic surfactants that may be mentioned include acetylenic surfactants, ethoxylated or propoxylated fatty alcohols, for example those of the Rhodasurf® or Antarox® brands, alkanolamides, amine oxides, ethoxylated alkanolamides, long-chain ethoxylated or propoxylated amines, for example those of the Rhodameen® brand, ethylene oxide/propylene oxide copolymers, sorbitan derivatives, ethylene glycol, propylene glycol, glycerol, polyglyceryl esters and ethoxylated derivatives thereof, alkylamines, alkylimidazolines, ethoxylated oils and ethoxylated or propoxylated alkylphenols, especially those of the Igepal® brand. Mention may also be made in particular of the products mentioned in WO 98/45212 under the brand names Igepal®, Dowanol®, Rhodamox® and Alkamide®.

As regards the carboxylic acids, use may in particular be made of aliphatic mono- or dicarboxylic acids and, among these, more particularly of saturated acids. Use may also be made of fatty acids and more particularly of saturated fatty acids. Mention may thus be made especially of formic, acetic, propionic, butyric, isobutyric, valeric, caproic, caprylic, capric, lauric, myristic, palmitic, stearic, hydroxystearic, 2-ethylhexanoic and behenic acids. Mention may be made, as dicarboxylic acids, of oxalic, malonic, succinic, glutaric, adipic, pimelic, suberic, azelaic and sebacic acids.

The salts of the carboxylic acids can also be used, in particular the ammonium salts.

Mention may more particularly be made, as example, of lauric acid and ammonium laurate.

Finally, it is possible to use a surfactant which is chosen from those of the carboxymethylated fatty alcohol ethoxylate type.

Product of the carboxymethylated fatty alcohol ethoxylate type is understood to mean the products composed of ethoxylated or propoxylated fatty alcohols comprising, at the chain end, a $CH_2$—COOH group.

These products may correspond to the formula:

$$R_1\text{—O—}(CR_2R_3\text{—}CR_4R_5\text{—O})_n\text{—}CH_2\text{—COOH}$$

in which $R_1$ denotes a saturated or unsaturated carbon chain, the length of which is generally at most 22 carbon atoms, preferably at least 12 carbon atoms; $R_2$, $R_3$, $R_4$ and $R_5$ can be identical and represent hydrogen or else $R_2$ can represent a $CH_3$ group and $R_3$, $R_4$ and $R_5$ represent hydrogen; and n is a non-zero integer which can range up to 50 and more particularly between 5 and 15, these values being inclusive. It should be noted that a surfactant can be composed of a mixture of products of the above formula for which $R_1$ can be saturated and unsaturated respectively or else products comprising both —$CH_2$—$CH_2$—O— and —$C(CH_3)$—$CH_2$—O— groups.

Another variant consists in first separating out the precipitate obtained from step (c) and then adding the surfactant additive to this precipitate.

The amount of surfactant used, expressed as a weight percentage of additive relative to the weight of the composition calculated as oxide, is generally between 5% and 100%, more particularly between 15% and 60%.

After the addition of the surfactant, the mixture obtained is preferably kept stirring for a time which may be of about one hour. The precipitate is then optionally separated from the liquid medium via any known means.

The precipitate separated out may optionally been washed, especially with aqueous ammonia.

In a final step (e) of the process according to the invention, the recovered and optionally dried precipitate is then calcined. This calcination makes it possible to develop the crystallinity of the product formed and it can also be adjusted and/or chosen according to the subsequent temperature of use intended for the composition according to the invention, this being done while taking into account the fact that the specific surface area of the product decreases as the calcination temperature employed increases. Such a calcination is generally carried out under air but a calcination carried out, for example, under an inert gas or under a controlled atmosphere (oxidizing or reducing) is very clearly not excluded.

In practice, the calcination temperature is generally limited to a range of values of between 300 and 900° C. over a time that may be, for example, between 1 hour and 10 hours.

Other variants of the preparation process of the invention will be described below. These variants differ from the first variant described previously in that the compound of the rare-earth metal other than cerium and of the additional element are introduced in the course of the process in a different manner from that which was described for the first variant.

According to a second variant, the process of the invention comprises the following steps:
(a1) a first liquid mixture is formed comprising cerium and zirconium compounds and a second liquid mixture is formed comprising compounds of the other rare-earth metal and, optionally, of the additional element;
(b1) the first mixture is reacted continuously with a basic compound
either in a reactor in which the residence time of the reaction medium in the mixing zone of the reactor is not more than 100 milliseconds,
or in a centrifugal reactor in which the residence time of the reaction medium in the mixing zone of the reactor is not more than 10 seconds, via which a first precipitate is obtained at the reactor outlet;
(b'1) this first precipitate is placed in contact with the abovementioned second liquid mixture, via which a second precipitate is obtained;
(c1) the second precipitate is heated in aqueous medium, the medium being maintained at a pH of at least 5;
(d1) an additive chosen from anionic surfactants, nonionic surfactants, polyethylene glycols, carboxylic acids and salts thereof, and surfactants of the carboxymethylated fatty alcohol ethoxylate type is added to the precipitate or to the reaction medium derived from the preceding step;
(e1) the solid derived from the preceding step is calcined.

The placing in contact of step (b'1) may take place by mixing with the second mixture, with stirring and in a second reactor, the first precipitate in suspension as derived from the reactor in which the reaction has taken place.

According to a third variant, the process of the invention comprises the following steps:
(a2) a first liquid mixture is formed comprising cerium and zirconium compounds and a second liquid mixture is formed comprising compounds of the other rare-earth metal and, optionally, of the additional element;
(b2) the first mixture is reacted continuously with a basic compound
either in a reactor in which the residence time of the reaction medium in the mixing zone of the reactor is not more than 100 milliseconds,
or in a centrifugal reactor in which the residence time of the reaction medium in the mixing zone of the reactor is not more than 10 seconds, via which a first precipitate is obtained at the reactor outlet;
(b'2) the abovementioned second liquid mixture is reacted with a basic compound, via which a second precipitate is obtained;
(b"2) the first and second precipitates are mixed together;
(c2) the mixture of precipitates obtained after the preceding step is heated in aqueous medium, the medium being maintained at a pH of at least 5;

(d2) an additive chosen from anionic surfactants, nonionic surfactants, polyethylene glycols, carboxylic acids and salts thereof, and surfactants of the carboxymethylated fatty alcohol ethoxylate type is added to the precipitate or to the reaction medium derived from the preceding step;
(e2) the solid derived from the preceding step is calcined.

According to a fourth variant, the process of the invention comprises the following steps:
(a3) a first liquid mixture is formed comprising cerium and zirconium compounds and a second liquid mixture is formed comprising compounds of the other rare-earth metal and, optionally, of the additional element;
(b3) the first mixture is reacted continuously with a basic compound
  either in a reactor in which the residence time of the reaction medium in the mixing zone of the reactor is not more than 100 milliseconds,
  or in a centrifugal reactor in which the residence time of the reaction medium in the mixing zone of the reactor is not more than 10 seconds, via which a precipitate is obtained at the reactor outlet;
(c3) said precipitate is heated in aqueous medium, the medium being maintained at a pH of at least 5;
(d3) an additive chosen from anionic surfactants, nonionic surfactants, polyethylene glycols, carboxylic acids and salts thereof, and surfactants of the carboxymethylated fatty alcohol ethoxylate type is added to the precipitate or to the reaction medium derived from the preceding step;
(d'3) the precipitate derived from the preceding step is placed in contact with the abovementioned second mixture;
(e3) the solid derived from the preceding step is calcined.

According to a fifth variant, the process of the invention comprises the following steps:
(a4) a first liquid mixture is formed comprising cerium and zirconium compounds and a second liquid mixture is formed comprising compounds of the other rare-earth metal and, optionally, of the additional element;
(b4) the first mixture is reacted continuously with a basic compound,
  either in a reactor in which the residence time of the reaction medium in the mixing zone of the reactor is not more than 100 milliseconds,
  or in a centrifugal reactor in which the residence time of the reaction medium in the mixing zone of the reactor is not more than 10 seconds, via which a first precipitate is obtained at the reactor outlet;
(c4) the precipitate obtained after the preceding step is heated in aqueous medium, the medium being maintained at a pH of at least 5;
(d4) an additive chosen from anionic surfactants, nonionic surfactants, polyethylene glycols, carboxylic acids and salts thereof, and surfactants of the carboxymethylated fatty alcohol ethoxylate type is added to the solid product or to the reaction medium derived from the preceding step;
(d'4) the abovementioned second liquid mixture is reacted with a basic compound, via which a second precipitate is obtained;
(d"4) this second precipitate is mixed with the solid or the medium obtained after step (d4);
(e4) the mixture thus obtained is calcined.

According to a sixth variant, the process of the invention comprises the following steps:
(a5) a first liquid mixture is formed comprising cerium and zirconium compounds;
(b5) said mixture is reacted continuously with a basic compound
  either in a reactor in which the residence time of the reaction medium in the mixing zone of the reactor is not more than 100 milliseconds,
  or in a centrifugal reactor in which the residence time of the reaction medium in the mixing zone of the reactor is not more than 10 seconds, via which a precipitate is obtained at the reactor outlet;
(c5) said precipitate is heated in aqueous medium, the medium being maintained at a pH of at least 5;
(d5) an additive chosen from anionic surfactants, nonionic surfactants, polyethylene glycols, carboxylic acids and salts thereof, and surfactants of the carboxymethylated fatty alcohol ethoxylate type is added to the precipitate or to the reaction medium derived from the preceding step;
(e5) the solid derived from the preceding step is calcined.
(f5) a second liquid mixture is formed comprising compounds of the other rare-earth metal and, optionally, of the additional element;
(g5) the calcined solid derived from step (e5) is impregnated with the second mixture;
(h5) the solid derived from the preceding step is calcined.

It may be noted that for the third and fifth variants, steps (b'2) and (d'4) of reaction with the basic compound may be performed continuously, in the same types of reactor and under the same conditions as those which were described for the first variant and step (b) thereof.

As mentioned above, the essential differences between the different variants described above lie in the mode of introduction of the compounds of the rare-earth metal other than cerium and of the additional element. This is why everything that has been described for the first variant applies identically for the characteristics common to this first variant and to the others. Thus, that which has been described regarding step (a), especially regarding the nature of the mixtures of the compounds of cerium, of zirconium, of the other rare-earth metal and of the additional element and regarding the preparation of these mixtures applies similarly for the other variants, especially for steps (a1), (a2), (a3), (a4), (a5) and (f5).

This is likewise the case for step (b) and steps (b1), (b2), (b3), (b4), (b5), (b'2) and (d'4).

The description of step (c) applies to the analogous steps (c1), (c2), (c3), (c4) and (c5) and that of step (d) also applies to steps (d1), (d2), (d3), (d4) and (d5).

The calcination conditions given for step (e) are also identical for the calcination steps (e1), (e2), (e3), (e4), (e5) and (h5).

According to another variant of the process of the invention, the additional elements iron, cobalt, strontium, copper and manganese may be not added during the preparation of the composition as was described above, but they may be provided using the impregnation method. In this case, the composition derived from the calcination and based on oxides of cerium, of zirconium and of at least one rare-earth metal other than calcium is impregnated with a solution of a salt of the additional element and then subjected to another calcination under the same conditions as those given above.

The product derived from the calcination is in the form of a powder and, if necessary, it may be deaggregated or ground as a function of the size desired for the constituent particles of this powder.

The compositions of the invention may also optionally be shaped so as to be in the form of granules, beads, cylinders or honeycombs of variable sizes.

The compositions of the invention may be used as catalysts or catalyst supports. Thus, the invention also relates to catalytic systems comprising the compositions of the invention. For such systems, these compositions may thus be applied to any support usually used in the field of catalysis, i.e. especially thermally inert materials. This support may be chosen from alumina, titanium oxide, cerium oxide, zirconium oxide, silica, spinels, zeolites, silicates, crystalline silicoaluminum phosphates or crystalline aluminum phosphates.

The compositions may also be used in catalytic systems comprising a coating (wash coat) having catalytic properties and based on these compositions, on a substrate of for example, the metal monolith type, for example FeCr alloy, or made of ceramic, for example of cordierite, silicon carbide, alumina titanate or mullite. The coating may itself also comprise a thermally inert material of the type such as those mentioned above. This coating is obtained by mixing the composition with this material, so as to form a suspension which may then be deposited on the substrate.

These catalytic systems and more particularly the compositions of the invention can have a great many applications. They are therefore particularly well-suited to, and thus usable in, the catalysis of various reactions, for instance dehydration, hydrosulfurization, hydrodenitrification, desulfurization, hydrodesulfurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, the oxidation of gases derived from stationary sources and also the treatment of exhaust gases from internal combustion engines, demetallation, methanation, the shift conversion or catalytic oxidation of the soot emitted by internal combustion engines, such as diesel engines or petrol engines operating under lean burn conditions.

The catalytic systems and the compositions of the invention may be used as NOx traps or in an SCR process, i.e. an NOx reduction process in which this reduction is performed with ammonia or an ammonia precursor such as urea.

In the case of these uses in catalysis, the compositions of the invention are generally employed in combination with precious metals; they thus act as support for these metals. The nature of these metals and the techniques for the incorporation of the latter in the support compositions are well-known to a person skilled in the art. For example, the metals can be platinum, rhodium, palladium or iridium; they can in particular be incorporated in the compositions by impregnation.

Among the mentioned uses, the treatment of the exhaust gases of internal combustion engines (motor vehicle afterburning catalysis) constitutes a particularly advantageous application. For this reason, the invention also relates to a process for treatment of exhaust gases from internal combustion engines, which is characterized in that use is made, as catalyst, of a catalytic system as described above or of a composition according to the invention and as described above.

Examples will now be given.

EXAMPLE 1

This example relates to a composition comprising 64% of cerium, 26% of zirconium, 5% of lanthanum and 5% of neodymium, these proportions being expressed as mass percentages of the oxides $ZrO_2$, $CeO_2$, $La_2O_3$ and $Nd_2O_3$.

The necessary amount of zirconium nitrate, of cerium nitrate, of lanthanum nitrate and of neodymium nitrate is introduced into a stirred beaker. The mixture is then made up with distilled water so as to obtain 1 liter of a solution of nitrates at 120 g/l (expressed here and throughout the examples as oxide equivalent).

An aqueous ammonia solution (10 mol/l) is introduced into another stirred beaker and the mixture is then made up with distilled water, so as to obtain a total volume of 1 liter and a stoichiometric excess of ammonia of 20%, relative to the cations to be precipitated.

The two solutions prepared previously are maintained under continual stirring and are introduced continuously into a Hartridge-Roughton rapid mixer of the type in FIG. 1 and with an inlet height (a) of 2 mm.

The pH at the mixer outlet is 9.2. The flow rate of each of the reagents is 30 l/h and the residence time is 12 ms.

The suspension of precipitate thus obtained is placed in a stainless-steel autoclave equipped with a stirring rotor. The temperature of the medium is brought to 100° C. for 30 minutes with stirring.

33 grams of lauric acid are added to the suspension thus obtained. The suspension is kept stirred for 1 hour.

The suspension is then filtered through a Büchner funnel and the filtered precipitate is then washed with aqueous ammonia solution.

The product obtained is then maintained in a steady stage at 700° C. for 4 hours and then deaggregated in a mortar.

COMPARATIVE EXAMPLE 2

This example relates to the same composition as that of Example 1.

The process begins with the same reagents, and 1 liter of a solution of zirconium, cerium, lanthanum and neodymium nitrates is prepared.

An aqueous ammonia solution (10 mol/l) is introduced into a stirred reactor and the mixture is then made up with distilled water, so as to obtain a total volume of 1 liter and a stoichiometric excess of ammonia of 20%, relative to the nitrates to be precipitated.

The solution of nitrates is introduced into the reactor with continual stirring for 1 hour. After the precipitation, the process is then performed in the same manner as in Example 1.

EXAMPLE 3

This example relates to a composition comprising 60% of cerium, 30% of zirconium, 3% of lanthanum and 7% of praseodymium, these proportions being expressed as mass percentages of the oxides $ZrO_2$, $CeO_2$, $La_2O_3$ and $Pr_6O_{11}$.

The necessary amount of zirconium nitrate, of cerium nitrate, of lanthanum nitrate and of praseodymium nitrate is introduced into a stirred beaker. The mixture is then made up with distilled water so as to obtain 1 liter of a solution of nitrates at 120 g/l.

An aqueous ammonia solution (10 mol/l) is introduced into another stirred beaker and the mixture is then made up with distilled water, so as to obtain a total volume of 1 liter and a stoichiometric excess of ammonia of 20%, relative to the cations to be precipitated.

The two solutions prepared previously are maintained under continual stirring, and are introduced continuously into the same rapid mixer as that of Example 1.

The pH at the mixer outlet is 9.1. The flow rate of each of the reagents is 30 l/h and the residence time is 12 ms.

The process is then performed as in Example 1.

COMPARATIVE EXAMPLE 4

This example relates to the same composition as that of Example 3.

The process begins with the same reagents, and 1 liter of a solution of zirconium, cerium, lanthanum and praseodymium nitrates is prepared.

An aqueous ammonia solution (10 mol/l) is introduced into a stirred reactor and the mixture is then made up with distilled water, so as to obtain a total volume of 1 liter and a stoichiometric excess of ammonia of 20%, relative to the nitrates to be precipitated.

The solution of nitrates is introduced into the reactor with continual stirring for 1 hour. After the precipitation, the process is then performed in the same manner as in Example 3.

EXAMPLE 5

This example relates to a composition comprising 80% of cerium, 10% of zirconium, 3% of lanthanum and 7% of praseodymium, these proportions being expressed as mass percentages of the oxides $ZrO_2$, $CeO_2$, $La_2O_3$ and $Pr_6O_{11}$.

The necessary amount of zirconium nitrate, of cerium nitrate, of lanthanum nitrate and of praseodymium nitrate is introduced into a stirred beaker. The mixture is then made up with distilled water, so as to obtain 1 liter of a solution of nitrates at 120 g/l.

An aqueous ammonia solution (10 mol/l) is introduced into another stirred beaker and the mixture is then made up with distilled water, so as to obtain a total volume of 1 liter and a stoichiometric excess of ammonia of 40%, relative to the cations to be precipitated.

The two solutions prepared previously are maintained under continual stirring, and are introduced continuously into the same rapid mixer as that of Example 1.

The pH at the mixer outlet is 9.2. The flow rate of each of the reagents is 30 l/h and the residence time is 12 ms.

The process is then performed as in Example 1.

COMPARATIVE EXAMPLE 6

This example relates to the same composition as that of Example 5.

The process begins with the same reagents, and 1 liter of a solution of zirconium, cerium, lanthanum and praseodymium nitrates is prepared.

An aqueous ammonia solution (10 mol/l) is introduced into a stirred reactor and the mixture is then made up with distilled water, so as to obtain a total volume of 1 liter and a stoichiometric excess of ammonia of 40%, relative to the nitrates to be precipitated.

The solution of nitrates is introduced into the reactor with continual stirring for 1 hour.

After the precipitation, the process is then performed in the same manner as in Example 4.

EXAMPLE 7

This example relates to a composition comprising 64% of cerium, 26% of zirconium, 5% of lanthanum and 5% of neodymium, these proportions being expressed as mass percentages of the oxides $ZrO_2$, $CeO_2$, $La_2O_3$ and $Nd_2O_3$. The preparation process used corresponds to the second variant described above.

The necessary amount of zirconium nitrate and of cerium nitrate is introduced into a stirred beaker. The mixture is then made up with distilled water, so as to obtain 1 liter of a solution of nitrates at 162 g/l (solution A).

The necessary amount of lanthanum nitrate and of neodymium nitrate is introduced into a second stirred beaker. The mixture is then made up with distilled water, so as to obtain 1 liter of a solution of nitrates at 18 g/l (solution B).

An aqueous ammonia solution (10 mol/l) is introduced into a third stirred beaker and the mixture is then made up with distilled water, so as to obtain a total volume of 1 liter and a stoichiometric excess of ammonia of 40%, relative to the cerium, zirconium, lanthanum and neodymium cations (solution C).

Solutions A and C prepared previously are maintained under continual stirring, and are introduced continuously into the same rapid mixer as that of Example 1.

The pH at the mixer outlet is 9.2. The flow rate of each of the reagents is 30 l/h and the residence time is 12 ms.

The suspension of precipitate thus obtained is placed in a reactor equipped with a stirring rotor. Solution B is then introduced into this reactor using a peristaltic pump. After introduction of solution B, the suspension of precipitate thus obtained is stirred for 30 minutes.

The suspension of precipitate obtained in the preceding step is then transferred into a stainless-steel autoclave equipped with a stirring rotor. The temperature of the medium is brought to 100° C. for 30 minutes with stirring.

33 grams of lauric acid are added to the suspension thus obtained. The suspension is kept stirred for 1 hour.

The suspension is then filtered through a Büchner funnel and the filtered precipitate is washed with aqueous ammonia solution.

The product obtained is then maintained in a steady stage at 700° C. for 4 hours and then deaggregated in a mortar.

EXAMPLE 8

This example relates to a composition comprising 64% of cerium, 26% of zirconium, 5% of lanthanum and 5% of neodymium, these proportions being expressed as mass percentages of the oxides $ZrO_2$, $CeO_2$, $La_2O_3$ and $Nd_2O_3$. The preparation process used corresponds to the sixth variant described above.

The necessary amount of zirconium nitrate and of cerium nitrate is introduced into a stirred beaker. The mixture is then made up with distilled water, so as to obtain 1 liter of a solution of nitrates at 120 g/l (solution A).

An aqueous ammonia solution (10 mol/l) is introduced into a second stirred beaker and the mixture is then made up with distilled water, so as to obtain a total volume of 1 liter and a stoichiometric excess of ammonia of 40%, relative to the cerium and zirconium cations (solution B).

Solutions A and B prepared previously are maintained under continual stirring, and are introduced continuously into the same rapid mixer as that of Example 1.

The pH at the mixer outlet is 9.2. The flow rate of each of the reagents is 30 l/h and the residence time is 12 ms.

The suspension of precipitate thus obtained is placed in a stainless-steel autoclave equipped with a stirring rotor. The temperature of the medium is brought to 100° C. for 30 minutes with stirring.

33 grams of lauric acid are added to the suspension thus obtained. The suspension is kept stirred for 1 hour.

The suspension is then filtered through a Büchner funnel and the filtered precipitate is washed with aqueous ammonia solution.

The product obtained is then maintained in a steady stage at 700° C. for 4 hours and then deaggregated in a mortar.

The necessary amount of lanthanum nitrate and of neodymium nitrate (mixture C) is introduced into a third stirred beaker. The dry and calcined precipitate obtained in the preceding step is then impregnated using said mixture C.

The product obtained is then maintained in a steady stage at 700° C. for 4 hours and then deaggregated in a mortar.

The characteristics of the products obtained in the examples are given in Tables 1 and 2 below.

TABLE 1

| | Specific surface area $S_{BET}$ (m²/g) after calcination for 4 hours at | | |
|---|---|---|---|
| Example | 900° C. | 1000° C. | 1100° C. |
| 1 | 67 | 42 | 28 |
| 2, comparative | 67 | 38 | 23 |
| 3 | 58 | 35 | 18 |
| 4, comparative | 48 | 38 | 18 |
| 5 | 47 | 28 | 15 |
| 6, comparative | 39 | 29 | 18 |
| 7 | 65 | 40 | 25 |
| 8 | 60 | 38 | 23 |

TABLE 2

| Example | Maximum reducibility temperature (° C.) 1000° C. [2] | Amount of O₂ that is labile between 200 and 400° C. (mL/g) 1000° C. [2] | Amount of O₂ that is labile between 200 and 450° C. (mL/g) 1000° C. [2] |
|---|---|---|---|
| 1 | 485 | 1.3 | 2.5 |
| 2, comparative | 558 | 0.4 | 1 |
| 3 | 502 | 1.4 | 2.8 |
| 4, comparative | 570 | 0.3 | 0.8 |
| 5 | 370-500 [3] | 1.2 | 2.9 |
| 6, comparative | 420-570 [3] | 0.5 | 0.9 |
| 7 | 490 | 1.2 | 2.2 |
| 8 | 487 | 1.1 | 2.1 |

[2] This temperature is that to which the composition was first subjected, for 4 hours, before the reducibility measurement.
[3] The curves obtained by the temperature-programmed reduction comprise two peaks, these two peaks both being located at a temperature below 520° C. for the composition of the invention.

It should be noted that the products of Examples 1 to 8 are in the form of a solid solution after calcination for 4 hours at 1000° C. and 4 hours at 1100° C.

Figure 2:
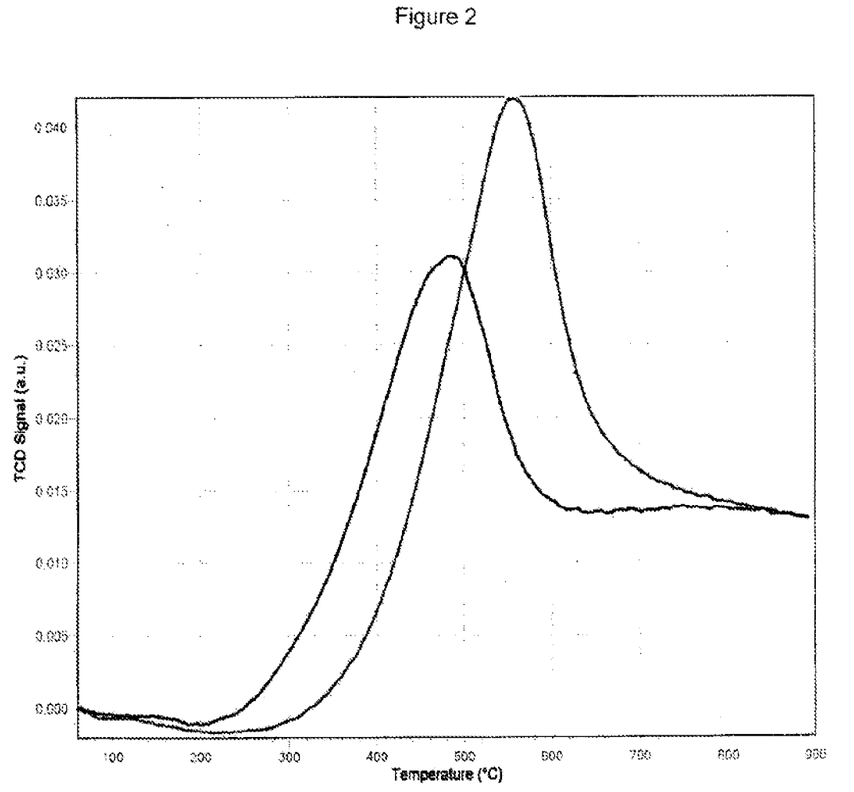
FIG. 2 shows the curves obtained by a measurement of reducibility by temperature-programmed reduction of a composition according to the invention and of a comparative product.

FIG. 2 gives the curves obtained by performing the reducibility measurement described above. The temperature is given on the x-axis and the value of the measured signal is given on the y-axis. The maximum reducibility temperature is that which corresponds to the maximum peak height of the curve. The figure gives the curves obtained for the compositions of Example 1 (curve with the peak to the extreme left of the figure) and comparative example 2 (curve with the peak to the extreme right).

The particle size characteristics of the products of the examples are given in Table 3 below.

The particle size measurements are performed under the following conditions.

Apparatus: Malvern Mastersizer 2000 (HydroG module) light-scattering particle size analyzer (particle size analysis by laser scattering).

Fraunhofer optical model (difference in scattering of the polarized intensities)

Sample: a mass of 0.5 g of product is suspended in an ultrasonication tank and in a volume of 80 ml of a 1 g/l solution of hexamethyl phosphate (HMP).

The suspension is deaggregated by running the tank for 5 minutes at 120 Watts.

Measurements: two measurements are taken using the suspension without and with ultrasonication treatment.

For these measurements, a sample of suspension is taken from the ultrasonication tank and introduced into the particle size analyzer, and is maintained under magnetic stirring.

TABLE 3

| | $D_{50}$ (μm) | |
|---|---|---|
| Example | Initial product | Product after treatment |
| 5 | 38.1 | 3.2 |
| 6, comparative | 41.6 | 23.8 |

The initial product is the product as obtained at the end of the process described in the examples, i.e. deaggregated in a mortar after calcination at 700° C.

The product after treatment is the product derived from the ultrasonication treatment of the initial product.

The process of the comparative example is much less deaggregatable than that of Example 1 according to the invention.

The invention claimed is:

1. A composition based on oxides of cerium, zirconium and at least one rare-earth metal other than cerium, with a cerium oxide content of greater than 50% by mass, wherein the composition has, after calcination at 1000° C. for 4 hours:
    a specific surface area of at least 20 m²/g;
    an amount of mobile oxygen between 200° C. and 400° C. of at least 0.8 ml O₂/g; and
    a maximum reducibility temperature of not more than 520° C.

2. The composition as claimed in claim 1, wherein the composition has an amount of mobile oxygen between 200° C. and 400° C. of at least 1 ml O₂/g.

3. The composition as claimed in claim 1, wherein the composition has an amount of mobile oxygen between 200° C. and 450° C. of at least 1 ml O₂/g.

4. The composition as claimed in claim 1, wherein the composition has, after calcination at 1000° C. for 4 hours, a specific surface area of at least 25 m²/g.

5. The composition as claimed in claim 1, wherein the composition has a cerium oxide content between 50% and 90%.

6. The composition as claimed in claim 1, wherein the composition has a content of oxide of the rare-earth metal other than cerium of not more than 30%.

7. The composition as claimed in claim 6, wherein the composition has a content of oxide of the rare-earth metal other than cerium of between 5% and 20%.

8. The composition as claimed in claim 1, wherein the rare-earth metal other than cerium is selected from yttrium, lanthanum, praseodymium, gadolinium and neodymium.

9. The composition as claimed in claim 1, further comprising one or more additional elements selected from iron, cobalt, strontium, copper and manganese.

10. The composition as claimed in claim 1, wherein the composition has a maximum reducibility temperature of not more than 520° C. after calcination at 1000° C. for 4 hours.

11. The composition as claimed in claim 1, wherein the composition is deaggregatable by an ultrasonication treatment and wherein, after the ultrasonication treatment, the composition is in the form of particles with a mean diameter (d50) of not more than 10 μm.

12. A catalytic system, comprising a composition as claimed in claim 1.

\* \* \* \* \*